US012783418B2

(12) United States Patent
DiTomaso et al.

(10) Patent No.: US 12,783,418 B2
(45) Date of Patent: Nov. 3, 2026

(54) CACHE PREFETCHING EMPLOYING HIT PREDICTION

(71) Applicant: International Business Machines Corporation, Armonk, NY (US)

(72) Inventors: Dominic DiTomaso, Hyde Park, NY (US); David Trilla Rodríguez, New York, NY (US); Alper Buyuktosunoglu, White Plains, NY (US); Craig R. Walters, Highland, NY (US); Ram Sai Manoj Bamdhamravuri, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 19/019,045

(22) Filed: Jan. 13, 2025

(65) Prior Publication Data

US 2026/0203225 A1 Jul. 16, 2026

(51) Int. Cl.
*G06F 12/00* (2006.01)
*G06F 12/0811* (2016.01)
*G06F 12/0862* (2016.01)

(52) U.S. Cl.
CPC ...... *G06F 12/0862* (2013.01); *G06F 12/0811* (2013.01); *G06F 2212/6028* (2013.01)

(58) Field of Classification Search
CPC ............. G06F 12/0862; G06F 12/0811; G06F 2212/6028
See application file for complete search history.

(56) References Cited

U.S. PATENT DOCUMENTS

| | | | | |
|---|---|---|---|---|
| 10,007,523 | B2 | 6/2018 | Srinivasan et al. | |
| 10,846,084 | B2 | 11/2020 | Nori et al. | |
| 10,877,893 | B2 | 12/2020 | Doerner | |
| 11,567,776 | B2 | 1/2023 | Mcdonald et al. | |
| 11,650,821 | B1 * | 5/2023 | Asserhall | G06F 9/321 712/207 |
| 2006/0095747 | A1 * | 5/2006 | Nancekievill | G06F 9/3844 712/240 |
| 2014/0297965 | A1 * | 10/2014 | Jayaseelan | G06F 12/0862 711/137 |
| 2019/0065376 | A1 * | 2/2019 | Lee | G06F 12/0855 |
| 2019/0370176 | A1 * | 12/2019 | Priyadarshi | G06F 12/0893 |
| 2023/0222066 | A1 * | 7/2023 | Karve | G06F 12/0817 711/137 |

OTHER PUBLICATIONS

Authors et al., Disclosed Anonymously, Mechanism to Decrease Cold Cache Startup Effects in Instruction Cache Pre-Fetching, IPCOM000248538D, Dec. 14, 2016, 7 pages.

(Continued)

*Primary Examiner* — Craig S Goldschmidt
(74) *Attorney, Agent, or Firm* — Cantor Colburn LLP; Edward Wixted

(57) ABSTRACT

A processor set has an associated cache memory. A prefetch unit of the processor set generates a prefetch request. The prefetch unit determines whether the prefetch request is likely to miss in the cache memory. The prefetch unit issues the prefetch request based on determining that the prefetch request is likely to miss in the cache memory and otherwise discards the prefetch request. The prefetch request can be a data prefetch request or an instruction prefetch request.

17 Claims, 6 Drawing Sheets

(56) References Cited

OTHER PUBLICATIONS

Authors et. al., Disclosed Anonymously, Value Prediction Implementation, IPCOM000263479D, Sep. 3, 2020, 5 pages.
Authors, et. al., Avoiding Deadlocks in a Multi-Processor Environment With a First Level Cache Using a Logical Directory, IPCOM000271077D, Oct. 12, 2022, 5 pages.
Authors, et al., Identification of Prior Icache Misses at an Instruction Prefetcher to Flag Future Candidate for Information Prefetch, IPCOM000266570D, Jul. 29, 2021, 6 pages.
Lee, et al., Filter Data Cache: An Energy-Efficient Small L0 Data Cache Architecture Driven by Miss Cost Reduction, IEEE Transactions on Computers, Jul. 2015, pp. 1927-1939.
Peir, et al., Bloom Filtering Cache Misses for Accurate Data Speculation and Prefetching, ICS '02: Proceedings of the 16th international conference on Supercomputing, Jun. 22•26, 2002, 10 pages.
Qureshi, et al., Fundamental Latency Trade-off in Architecting DRAM Caches: Outperforming Impractical SRAM-Tags with a Simple and Practical Design, IEEE/ACM 45th Annual International Symposium on Microarchitecture, Dec. 2012, pp. 235-246.
Tyson, et al., A Modified Approach to Data Cache Management, Proceedings of MICRO-28, Nov. 29, 1995, pp. 93-103.
Wu, et al., Ship: Signature-Based Hit Predictor For High-Performance Caching, MICRO '11, Dec. 3-7, 2011, 12 pages.
Yang, et al., A Prefetch-Adaptive Intelligent Cache Replacement Policy Based on Machine Learning, Journal of Computer Science and Technology, Mar. 2023, vol. 38, Issue. 2, pp. 391-404.
Yoaz, et al., Speculation Techniques for Improving Load Related Instruction Scheduling, Proceedings of the 26th Annual International Symposium on Computer Architecture May 1, 1999, 12 pages.

* cited by examiner

CACHE PREFETCHING EMPLOYING HIT PREDICTION

BACKGROUND OF THE INVENTION

The present invention relates in general to data processing and, in particular, to a cache prefetching technique that controls prefetching based on cache hit/miss prediction.

Cache memories are commonly utilized in computer systems to temporarily buffer memory blocks from system memory that are likely to be accessed by a processor core in order to speed up processing by reducing access latency introduced by having to load needed data and instructions from system memory. In some cases, the processor core may include a prefetch unit that is designed to access data likely to be subject to a demand access by the processor core in advance of the demand access and store the data in the processor core's vertical cache hierarchy. By accessing and caching the data in advance of a demand access, a process referred to as "prefetching," the overall access latency to which demand accesses of the processor core are subject can be reduced.

SUMMARY OF THE INVENTION

The present disclosure appreciates that prefetching is beneficial in cases in which prefetch requests miss in an associated cache memory. However, prefetch requests that are found to hit in the associated cache memory unnecessarily expend power in shared resources like shared buses or the memory stages of the request pipeline and impair performance of other demand and prefetch requests that contend for use of the request pipelines.

Accordingly, in one or more embodiments, a prefetching technique is presented in which issuance of a prefetch request is based on a prediction that the prefetch request will miss in a target cache into which data is to be prefetched.

In one or more embodiments, a processor set has an associated cache memory. A prefetch unit of the processor set generates a prefetch request. The prefetch unit determines whether the prefetch request is likely to miss in the cache memory. The prefetch unit issues the prefetch request based on determining that the prefetch request is likely to miss in the cache memory and otherwise discards the prefetch request. The prefetch request can be a data prefetch request or an instruction prefetch request.

Figure 1:
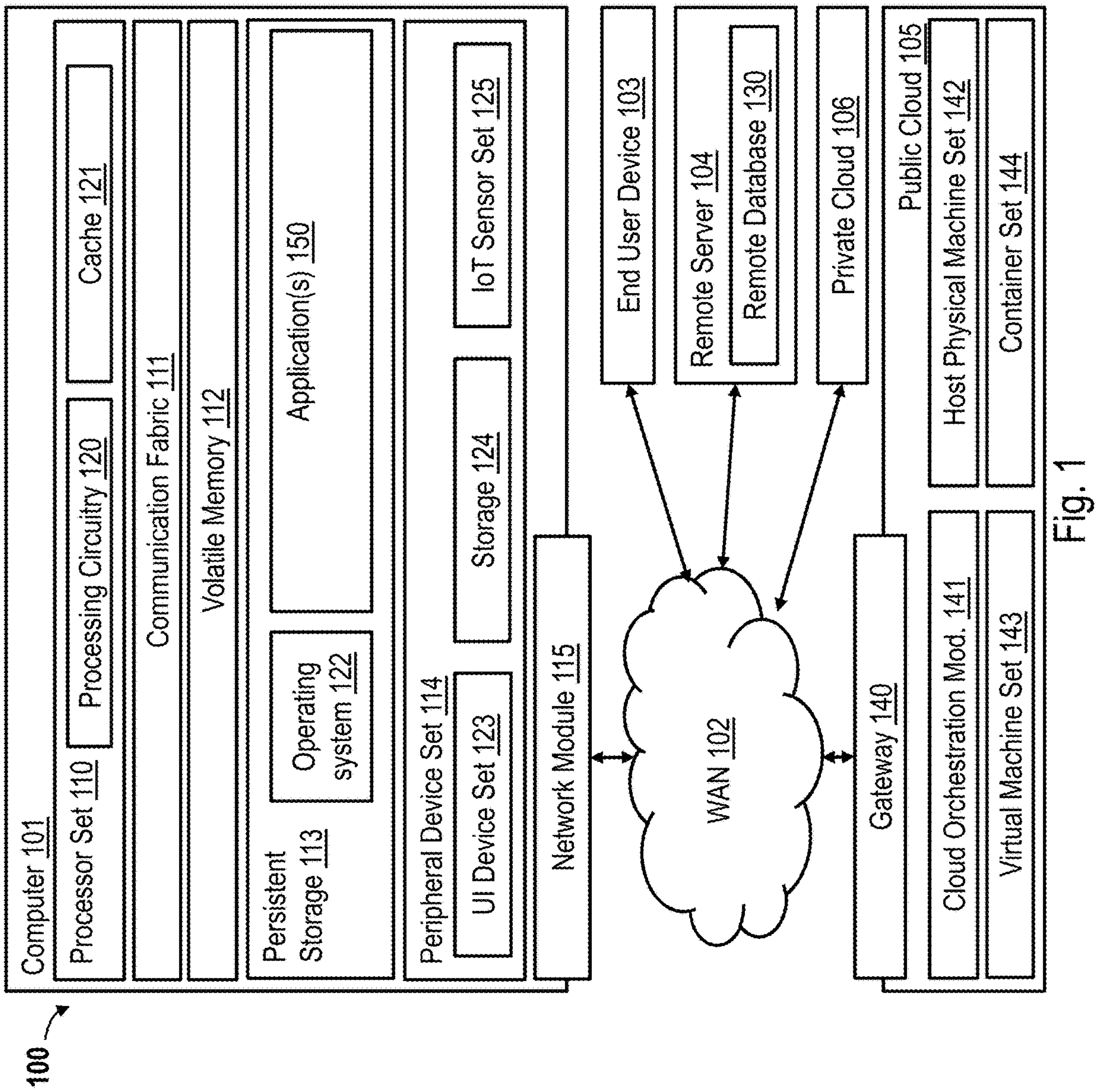
FIG. 1 is a high-level block diagram of an exemplary data processing environment in accordance with one or more embodiments.

In accordance with common practice, various features illustrated in the drawings may not be drawn to scale. Accordingly, dimensions of the various features may be arbitrarily expanded or reduced for clarity. In addition, some of the drawings may not depict all of the components of a given system, method, or device. Finally, like reference numerals may be used to denote like or corresponding features in the specification and figures.

DETAILED DESCRIPTION OF ILLUSTRATIVE EMBODIMENT

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer-readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer-readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

With reference now to FIG. 1, computing environment 100 contains an example of an environment for the execution of computer code. In addition, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and other code and data), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one or more computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer-readable program instructions are typically loaded onto computer 101 to cause a series of operational steps to be performed by processor set 110 of computer 101 and thereby effect a computer-implemented method. These computer-readable program instructions are stored in various types of computer-readable storage media, such as cache 121 and the other storage media discussed below. The program instructions, and associated data, are accessed by processor set 110 to control and direct performance of the inventive methods.

Communication fabric 111 is the signal conduction path that allows the various components of computer 101 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet-of-Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer-readable program instructions for performing the inventive methods can typically be downloaded to computer 101 from an external computer or external storage device through a network adapter card or network interface included in network module 115.

WAN 102 is any wide area network (for example, the Internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End User Device (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments a private cloud may be disconnected from the Internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Those of ordinary skill in the art will appreciate that the architecture and components of a data processing environment can vary between embodiments. Accordingly, the exemplary computing environment 100 given in FIG. 1 is not meant to imply architectural limitations with respect to the claimed invention.

Figure 2:
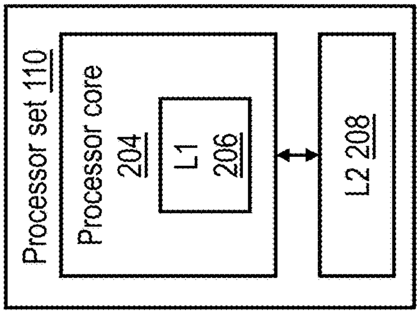
FIG. 2 illustrates a more detailed block diagram of an exemplary processor set in accordance with one or more embodiments.

Referring now to FIG. 2, there is depicted a more detailed block diagram of an exemplary processor set 110 of FIG. 1 in accordance with one or more embodiments. In this example, processor set 110 includes one or more processor cores 204 each coupled to a respective vertical cache hierarchy providing low latency access to instructions and operands likely to be read and/or written by the associated processor core 204. In the depicted example, the vertical cache hierarchy coupled to each processor core 204 includes at least a level one (L1) cache 206 characterized by a relatively smaller storage capacity and lower access latency and a level two (L2) cache 208 characterized by a relatively larger storage capacity and higher access latency. In some embodiments, like that depicted in FIGS. 3-4, L1 cache 206 may be bifurcated into separate L1 instruction and data caches.

Figure 3:
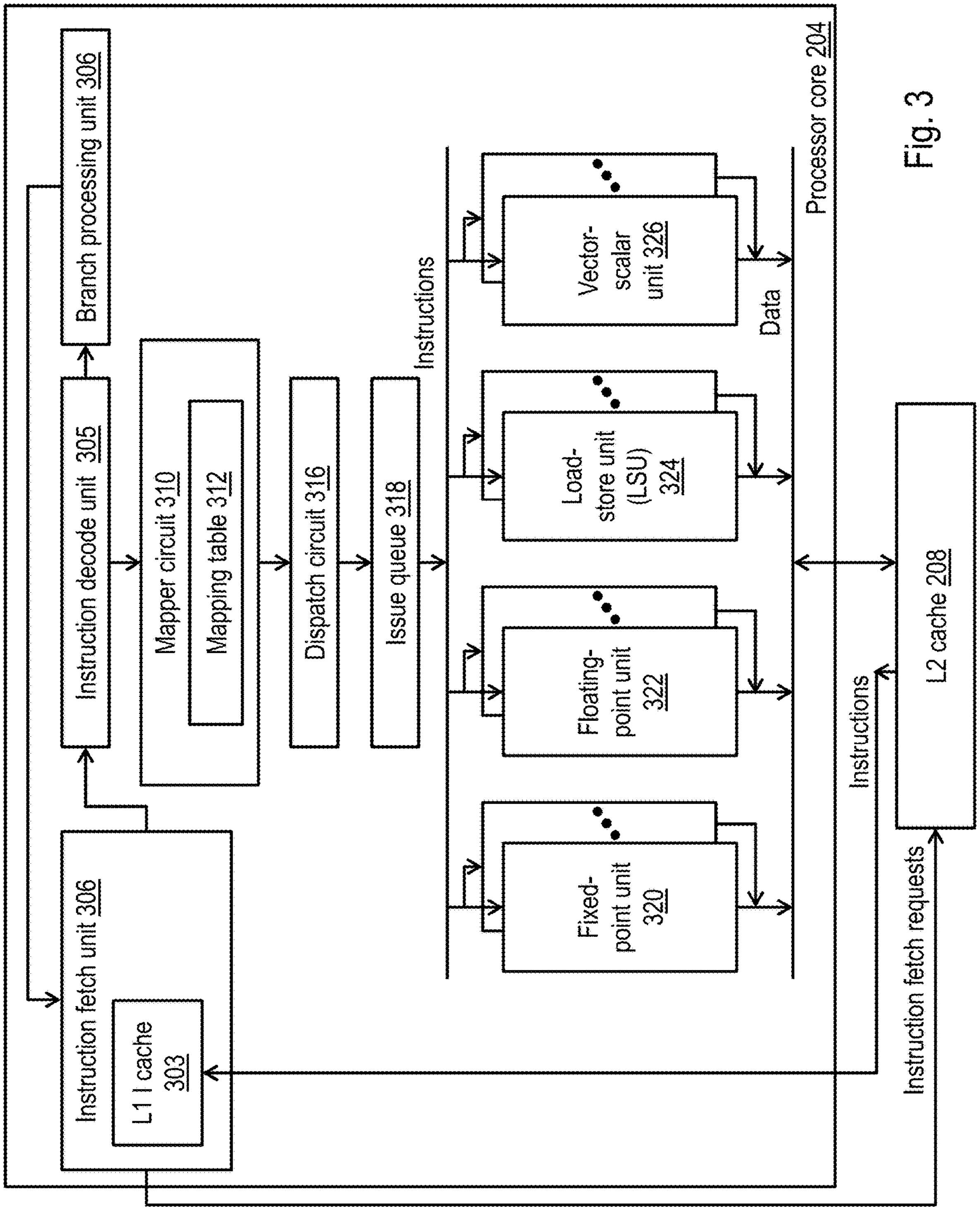
FIG. 3 is a high-level block diagram of an exemplary processor core in accordance with one or more embodiments.

With reference now to FIG. 3, there is depicted a high-level block diagram of an exemplary processor core 204 in accordance with one or more embodiments. In the depicted example, processor core 204 includes an instruction fetch unit 306 that fetches instructions within one or more streams of instructions from lower level storage (e.g., L2 cache 208) and buffers fetched instructions in L1 instruction cache 303. In a typical implementation, each instruction has a format defined by the instruction set architecture of processor core 204 and includes at least an operation code (opcode) field specifying an operation (e.g., fixed-point or floating-point arithmetic operation, vector operation, matrix operation, logical operation, branch operation, memory access operation, etc.) to be performed by processor core 204. Certain instructions may additionally include one or more operand fields directly specifying operands or implicitly or explicitly referencing one or more core registers storing source operand(s) to be utilized in the execution of the instruction and one or more core registers for storing destination operand(s) generated by execution of the instruction. Instruction decode unit 305, which in some embodiments may be merged with instruction fetch unit 306, decodes the instructions fetched by instruction fetch unit 306 and forwards branch instructions that control the flow of execution to branch processing unit 306 for processing. In some embodiments, the processing of branch instructions performed by branch processing unit 306 may include speculating the outcome of conditional branch instructions. The results of branch processing (both speculative and non-speculative) by branch processing unit 306 may, in turn, be utilized to redirect one or more streams of instruction fetching by instruction fetch unit 306.

Instruction decode unit 305 forwards instructions that are not branch instructions (often referred to as "sequential instructions") to mapper circuit 310. Mapper circuit 310 is responsible for the assignment of physical registers within the register files of processor core 204 to instructions as needed to support instruction execution. Mapper circuit 310 may implement register renaming. Thus, for at least some classes of instructions, mapper circuit 310 may establish transient mappings between a set of logical (or architected) registers referenced by the instructions and a larger set of physical registers within the register files of processor core 204. As a result, processor core 204 can avoid unnecessary serialization of instructions that are not data dependent, as might otherwise occur due to the reuse of the limited set of architected registers by instructions proximate in program order. To support register renaming, mapper circuit 310 maintains a mapping data structure, referred to herein as mapping table 312, which is utilized to track free physical registers, transient mappings between logical register names and physical registers, and data dependencies between instructions.

Still referring to FIG. 3, processor core 204 additionally includes a dispatch circuit 316 configured to ensure that any data dependencies between instructions are observed and to dispatch sequential instructions as they become ready for execution. Instructions dispatched by dispatch circuit 316 are temporarily buffered in an issue queue 318 until the execution units of processor core 204 have resources available to execute the dispatched instructions. As the appropriate execution resources become available, issue queue 318 issues instructions from issue queue 318 to the execution units of processor core 204 based on instruction type opportunistically and possibly out-of-order with respect to the original program order of the instructions.

In the depicted example, processor core 204 includes several different types of execution units for executing respective different classes of instructions. In this example, the execution units of processor core 204 include one or more fixed-point units 320 for executing instructions that access fixed-point operands, one or more floating-point units 322 for executing instructions that access floating-point operands, one or more load-store units 324 for loading data from and storing data to storage, and one or more vector-scalar units 326 for executing instructions that access vector and/or scalar operands. In a typical embodiment, each execution unit is implemented as a multi-stage pipeline in which multiple instructions can be simultaneously processed at different stages of execution. Each execution unit preferably includes or is coupled to access at least one register file including a plurality of physical registers for temporarily buffering operands accessed in or generated by instruction execution.

Those skilled in the art will appreciate that processor core 204 may include additional unillustrated components, such as logic configured to manage the completion and retirement of instructions for which execution by execution units 320-326 is finished. Because these additional components are not necessary for an understanding of the described embodiments, they are not illustrated in FIG. 3 or discussed further herein.

Figure 4:
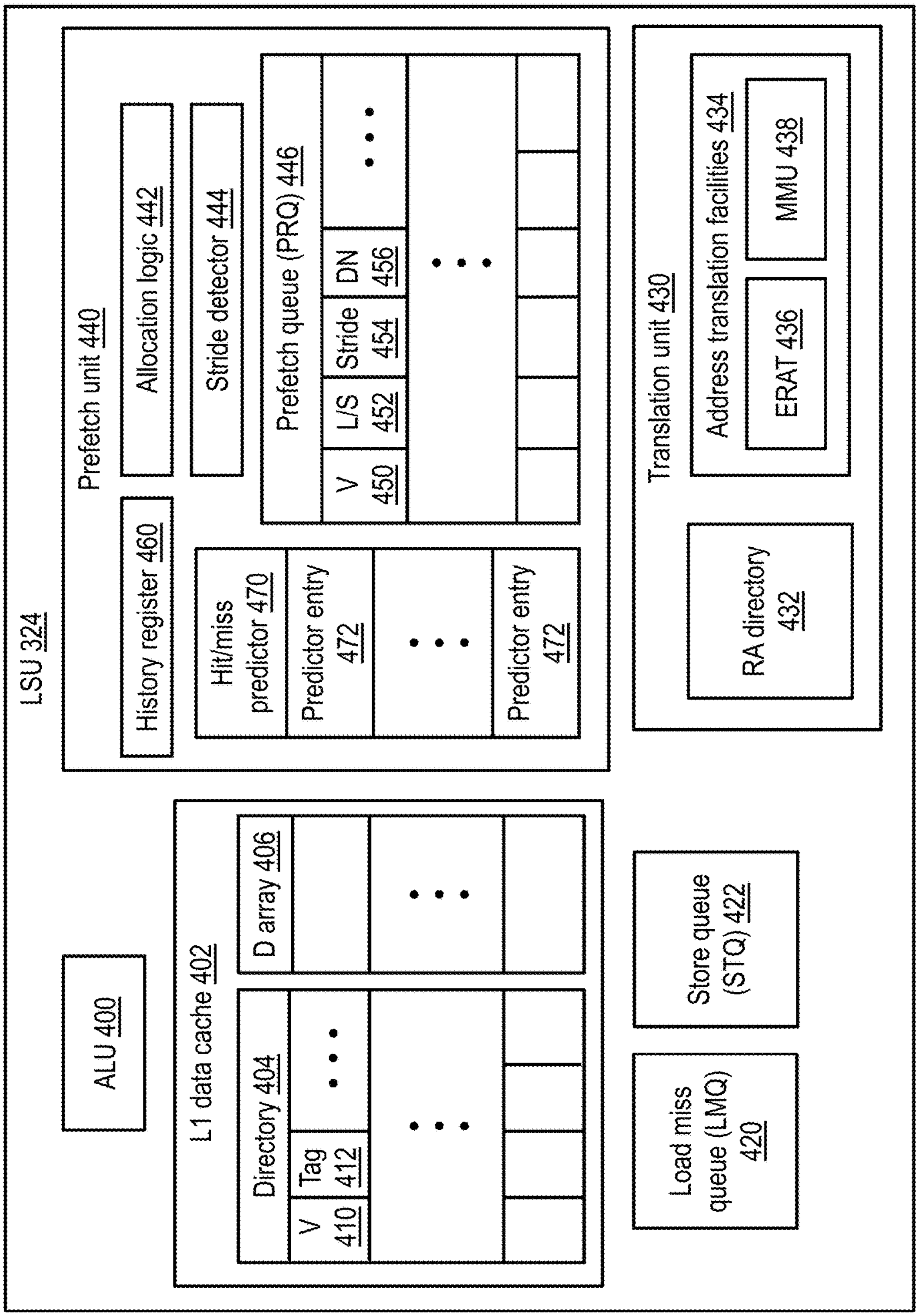
FIG. 4 is a high-level block diagram of an exemplary execution unit of a processing unit in accordance with one or more embodiments.

Referring now to FIG. 4, there is depicted a high-level block diagram of an exemplary load-store unit (LSU) 324 of a processor core 204 in accordance with one or more embodiments. In this example, LSU 324 includes an arithmetic logic unit (ALU) 400 that receives operand value(s) of memory access instructions issued from issue queue 318 to LSU 324 and, based on the operand value(s), computes the target addresses to which access is to be made by the memory access instructions. LSU 324 additionally includes L1 data cache 402, which can be configured as a store-in or store-through cache and can be implemented, for example, with a conventional set-associative organization. L1 data cache 402 includes a data (D) array 406 and a directory 404. Data array 406 contains a plurality of data entries for buffering cache lines of data likely to be accessed by processor core 204, and directory 404 contains a plurality of directory entries each corresponding to a respective one of the data entries in data array 406. Each of the directory entries in directory 404 includes, for example, at least a valid field 410 indicating whether or not contents of that directory entry are valid, a tag field 412 for specifying a tag portion of an address (effective address (EA) or real address (RA)) of a cache line (which may or may not be buffered in the corresponding data entry of data array 406).

LSU 324 additionally includes a load miss queue (LMQ) 420 and a store queue (STQ) 422. LMQ 420 includes a plurality of entries for buffering load-type requests of processor core 204 that miss in L1 data cache 402 until the load-type requests can be satisfied by cache lines supplied by the associated L2 cache 208. STQ 422 buffers store-type requests of processor core 204 until the target addresses of the store-type requests can be translated (if necessary) and the store-type requests can be forwarded to L2 cache 208. In order to facilitate address translation, LSU 224 can additionally include a translation unit 430, which may include one or more address translation facilities 434 for address translation, such as an effective-to-real address translation (ERAT) cache 436 and/or a memory management unit (MMU) 438, which may in turn have facilities such a translation lookaside buffer (TLB) and/or segment lookaside buffer (SLB) for buffering address translation entries from in-memory address translation data structure(s). As noted, translation unit 330 may also include a RA directory 432 for buffering RAs corresponding to EAs translated by address translation facilities 434.

LSU 324 additionally includes a hardware prefetch unit (or circuit) 440, which initiates prefetching of data in one or more multiple prefetch streams from lower level storage into L1 data cache 402. In the depicted embodiment, prefetch unit 440 includes at least allocation logic 442, stride detector 444, and prefetch queue (PRQ) 446. Allocation logic 442 can form load prefetch streams and store prefetch streams, for example, based on demand load-type and store-type memory accesses received by LSU 324 and/or software-supplied prefetch hints. In response to determining to form a prefetch stream, allocation logic 442 allocates a PRQ entry to the prefetch stream within PRQ 446, possibly evicting an invalid PRQ entry or a valid PRQ entry associated with a previously formed prefetch stream (e.g., using a least recently used (LRU) replacement scheme). In some embodiments, each PRQ entry includes a valid field 450 indicating whether the contents of that PRQ entry are valid, a load/store (L/S) field 452 indicating whether the associated prefetch stream is fetching data for load-type or store-type memory accesses, a stride field 454 indicating a stride (e.g., number of cache lines) between accesses in the associated prefetch stream, and a direction (DN) field 456 indicating a direction of stride (e.g., ascending or descending addresses). In at least some embodiments, the initial values of stride field 454 and direction field 456 may be set by PRQ 446 based on default values (e.g., to prefetch the adjacent cache line at the next higher cache line address) and then updated by prefetch unit 440 based on a different stride detected in demand memory access requests by stride detector 444.

In preferred embodiments, allocation logic 442 allocates a prefetch stream based on whether or not a prefetch address is likely to hit in L1 directory 404. In one exemplary embodiment, prefetch unit 440 includes a history register 460 tracking the hit/miss results of the last N (a positive integer) prefetch and demand fetch accesses to L1 data cache 402. For example, history register 460 may be an N-bit shift register in which each L1 hit among the immediately previous N accesses is indicated by a "1", and each L1 miss among the immediately previous N accesses is indicated by a "0". Prefetch unit 440 may further include a hit/miss predictor 470 that includes $2^N$ predictor entries 472, each corresponding to a respective value of history register 460 and thus providing a hit/miss prediction for the associated hit/miss history specified in history register 460. In one example, each predictor entry 472 can be implemented as a saturating counter that is incremented in response to a hit and decremented in response to a miss. Thus, assuming, for example, that each predictor entry 472 is implemented as a 2-bit saturating counter, counter values of "00" and "01" can indicate that a miss is predicted based on the hit/miss history recorded in history register 460, and counter values of "10" and "11" can indicate that a hit is predicted based on the hit/miss history recorded in history register 460.

Figure 5:
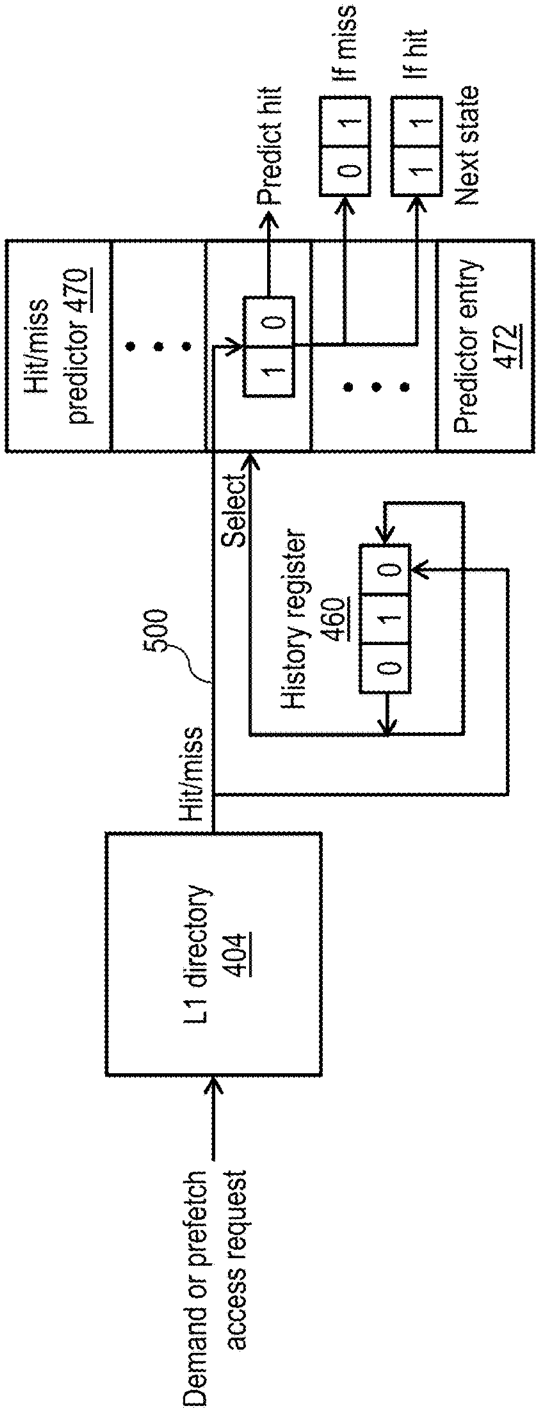
FIG. 5 is a data flow diagram illustrating the generation of a prefetch hit/miss prediction in accordance with one or more embodiments.

Exemplary operation of history register 460 and hit/miss predictor 470 is depicted in FIG. 5. In this example, L1 directory 404 is accessed by a demand fetch or prefetch access request. In response to the access request, L1 directory 404 generates a hit/miss indication 500 that indicates whether or not the target address of the access request hit in L1 directory 404. Hit/miss indication 500 updates the history pattern recorded in history register 460, which is then utilized to select one of the predictor entries 472 in hit/miss predictor 470. The value in the selected predictor entry 472 is utilized by prefetch unit 440 to determine whether or not to initiate a prefetch request. In the illustrated example, prefetch unit 440 does not initiate a prefetch request based on the prediction of an L1 hit indicated by the value "10" present in the selected predictor entry 472. Following the access to the hit/miss prediction in the selected predictor entry 472, prefetch unit 440 updates the value in the selected predictor entry 472 based on hit/miss indication 500. That is, if hit/miss indication 500 indicates a miss, prefetch unit 440 decrements the value of the selected predictor entry 472 in a saturating manner. Conversely, if hit/miss indication 500 indicates a hit, prefetch unit 440 increments the value of the selected predictor entry 472 in a saturating manner.

Figure 6:
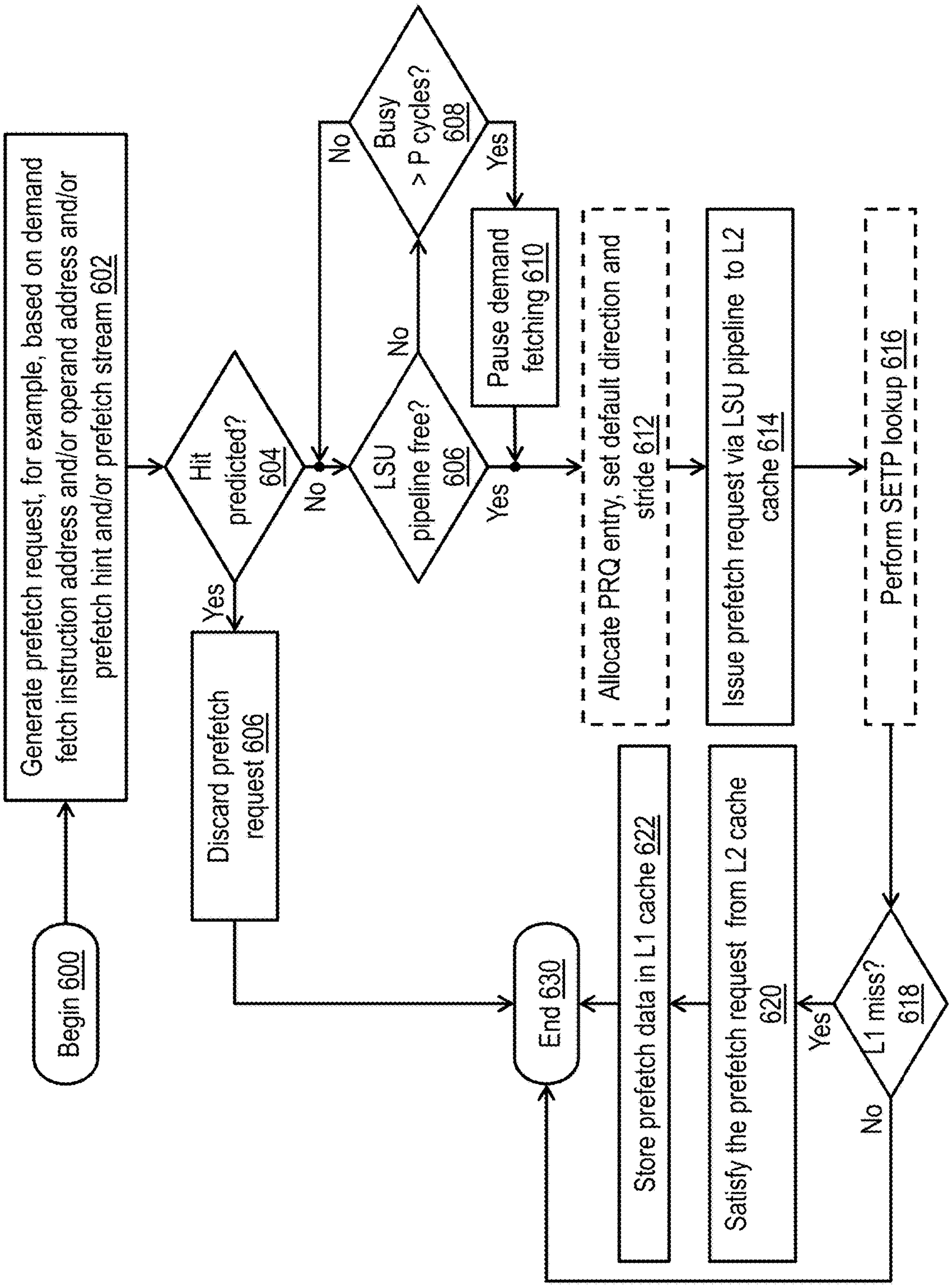
FIG. 6 is a high-level logical flowchart of an exemplary method of prefetching in accordance with one or more embodiments.

Referring now to FIG. 6, there is depicted a high-level logical flowchart of an exemplary method of prefetching in accordance with one or more embodiments. The process of FIG. 6 can be performed in hardware, for example, by prefetch unit 440 of FIG. 4.

The process of FIG. 6 begins at block 600 and then proceeds to block 602, which illustrates prefetch unit 440 generating a prefetch request. As indicated, in various embodiments, prefetch unit 440 may initiate the prefetch request based on one or a combination of criteria, including, for example, an instruction address of a demand fetch instruction, an operand address of a demand fetch instruction, a prefetch hint appended to a demand fetch instruction, and/or a prefetch stream established in an entry of prefetch queue 446. At block 604, prefetch unit 440 determines whether or not to issue the prefetch request to the cache hierarchy of processor core 204 based on whether or not the target address of the prefetch request is expected to hit in directory 404 of L1 data cache 402. As described above with respect to FIGS. 4-5, in one or more embodiments, prefetch unit 440 may make the determination depicted at block 604 based on a counter value in a predictor entry 472 of hit/miss predictor 470 selected by a hit/miss history pattern over the prior N accesses to L1 data cache 402. In response to prefetch unit 440 determining at block 604 that a cache hit is predicted, meaning the prefetch request is likely to be wasteful of the pipelines of LSUs 324, prefetch unit 440 discards the prefetch request generated at block 602 (block 606). Thereafter, the process of FIG. 6 ends at block 630. If, however, prefetch unit 440 determines at block 604 that the prefetch request generated at block 602 is not likely to hit in L1 data cache 402, the process of FIG. 6 proceeds to block 606.

Block 606 depicts prefetch unit 440 determining whether or not a time slot is available in the pipeline of LSU 324 for the prefetch request generated at block 602. If prefetch unit 440 determines at block 606 that a time slot is not available for the prefetch request in the LSU pipeline 324, prefetch unit 440 pauses the issuance of demand fetch requests into the pipeline of LSU 324 if the LSU pipeline will be busy with demand fetch request for more than P cycles (P being a positive integer) (blocks 608-610). Pausing demand fetch requests in this manner creates a time slot in the LSU pipeline for the prefetch request generated at block 602. Following either an affirmative determination at block 606 or following block 610, the process proceeds to optional block 612.

Referring now to block 612, prefetch unit 440 may optionally establish a prefetch stream based on the prefetch request by creating a corresponding new entry of prefetch queue 446. The process then proceeds to block 614, which illustrates prefetch unit 440 issuing the prefetch request to L2 cache 208 via the LSU pipeline. At block 616, prefetch unit 440 optionally initiates a lookup in an unillustrated set predictor (SETP) that predicts the L1 set that contain the requested prefetch data. LSU 324 uses the result of SETP to speculatively access the data in case the access hits in L1 data cache 402. Accessing the SETP only in cases in which a miss is predicted at block 604 optimizes power dissipation and performance.

At block 618, prefetch unit 440 determines whether the prefetch request will miss in L1 cache 206. In response to a determination at block 618 that the prefetch request will hit in L1 cache 206, the process passes to block 630 and terminates. However, in response to a determination at block 618 that the prefetch request will miss in L1 cache 206, prefetch unit 440 causes the prefetch request to be satisfied with data received from L2 cache 208 (block 620). Following block 620, the process passes to block 622, which illustrates L1 data cache 402 storing a cache line of prefetch data returned from L2 cache 208 in L1 data array 406 and creating a corresponding entry in L1 directory 404. Thereafter, the process of FIG. 6 ends at block 630.

Figure 7:
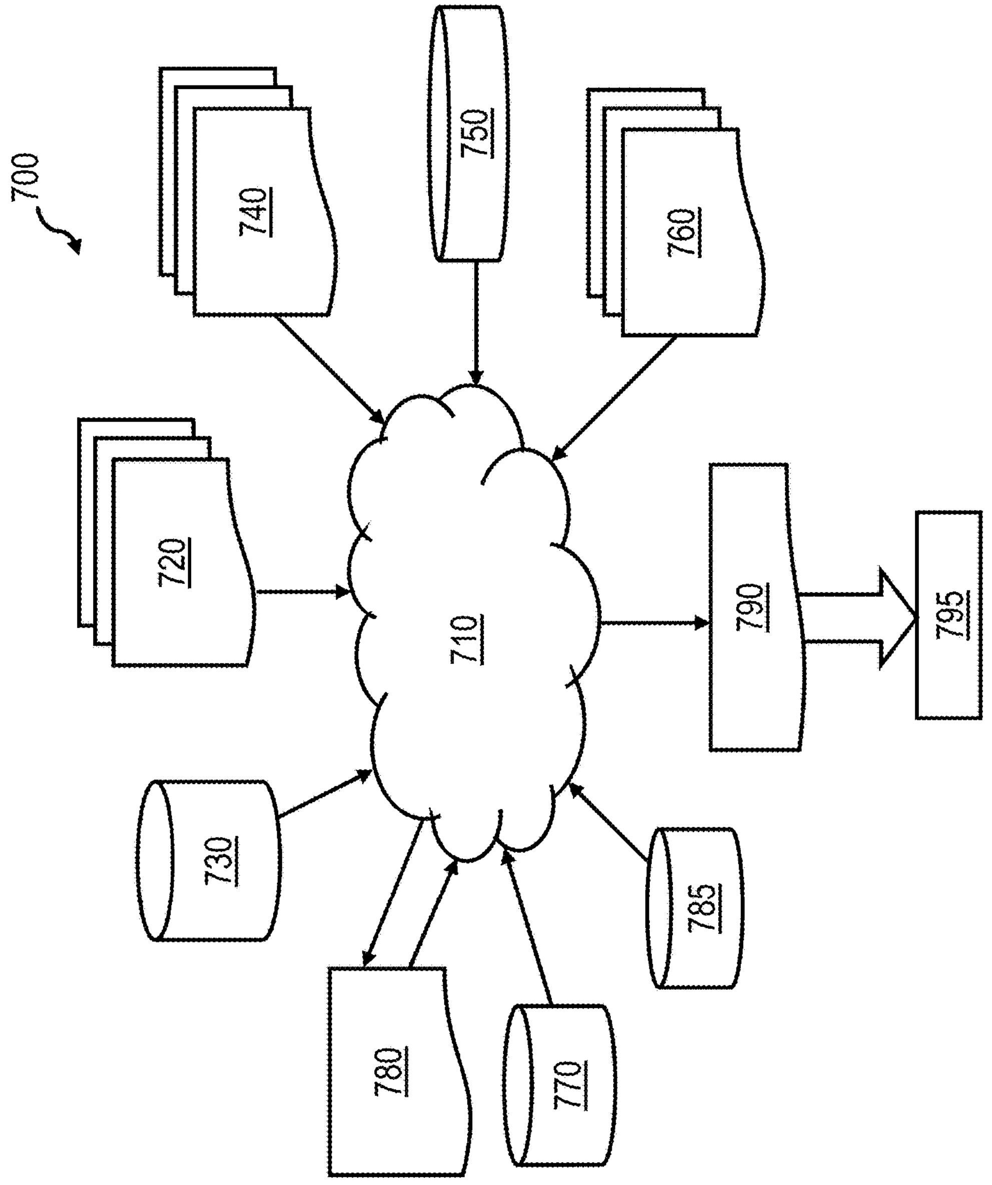
FIG. 7 is a block diagram of an exemplary design flow in accordance with one or more embodiments.

With reference now to FIG. 7, there is illustrated a block diagram of an exemplary design flow 700 used for example, in semiconductor IC logic design, simulation, test, layout, and manufacture. Design flow 700 includes processes, machines and/or mechanisms for processing design structures or devices to generate logically or otherwise functionally equivalent representations of the design structures and/or devices described above and shown herein. The design structures processed and/or generated by design flow 700 may be encoded on machine-readable transmission or storage media to include data and/or instructions that when executed or otherwise processed on a data processing system generate a logically, structurally, mechanically, or otherwise functionally equivalent representation of hardware components, circuits, devices, or systems. Machines include, but are not limited to, any machine used in an IC design process, such as designing, manufacturing, or simulating a circuit, component, device, or system. For example, machines may include: lithography machines, machines and/or equipment for generating masks (e.g. e-beam writers), computers or equipment for simulating design structures, any apparatus used in the manufacturing or test process, or any machines for programming functionally equivalent representations of the design structures into any medium (e.g. a machine for programming a programmable gate array).

Design flow 700 may vary depending on the type of representation being designed. For example, a design flow 700 for building an application specific IC (ASIC) may differ from a design flow 700 for designing a standard component or from a design flow 700 for instantiating the design into a programmable array, for example a programmable gate array (PGA) or a field programmable gate array (FPGA) offered by Altera® Inc. or Xilinx® Inc.

FIG. 7 illustrates multiple such design structures including an input design structure 1020 that is preferably processed by a design process 710. Design structure 720 may be a logical simulation design structure generated and processed by design process 710 to produce a logically equivalent functional representation of a hardware device. Design structure 720 may also or alternatively comprise data and/or program instructions that when processed by design process 710, generate a functional representation of the physical structure of a hardware device. Whether representing functional and/or structural design features, design structure 720 may be generated using electronic computer-aided design (ECAD) such as implemented by a core developer/designer. When encoded on a machine-readable data transmission, gate array, or storage medium, design structure 720 may be accessed and processed by one or more hardware and/or software modules within design process 710 to simulate or otherwise functionally represent an electronic component, circuit, electronic or logic module, apparatus, device, or system such as those shown herein. As such, design structure 720 may comprise files or other data structures including human and/or machine-readable source code, compiled structures, and computer-executable code structures that when processed by a design or simulation data processing system, functionally simulate or otherwise represent circuits or other levels of hardware logic design. Such data structures may include hardware-description language (HDL) design entities or other data structures conforming to and/or compatible with lower-level HDL design languages such as Verilog and VHDL, and/or higher level design languages such as C or C++.

Design process 710 preferably employs and incorporates hardware and/or software modules for synthesizing, translating, or otherwise processing a design/simulation functional equivalent of the components, circuits, devices, or logic structures shown herein to generate a netlist 780 which may contain design structures such as design structure 720. Netlist 780 may comprise, for example, compiled or otherwise processed data structures representing a list of wires, discrete components, logic gates, control circuits, I/O devices, models, etc. that describes the connections to other elements and circuits in an integrated circuit design. Netlist 780 may be synthesized using an iterative process in which netlist 780 is resynthesized one or more times depending on design specifications and parameters for the device. As with other design structure types described herein, netlist 780 may be recorded on a machine-readable storage medium or programmed into a programmable gate array. The medium may be a non-volatile storage medium such as a magnetic or optical disk drive, a programmable gate array, a compact flash, or other flash memory. Additionally, or in the alternative, the medium may be a system or cache memory, or buffer space.

Design process 710 may include hardware and software modules for processing a variety of input data structure types including netlist 780. Such data structure types may reside, for example, within library elements 730 and include a set of commonly used elements, circuits, and devices, including models, layouts, and symbolic representations, for a given manufacturing technology (e.g., different technology nodes, 32 nm, 45 nm, 70 nm, etc.). The data structure types may further include design specifications 740, characterization data 750, verification data 760, design rules 790, and test data files 785 which may include input test patterns, output test results, and other testing information. Design process 710 may further include, for example, standard mechanical design processes such as stress analysis, thermal analysis, mechanical event simulation, process simulation for operations such as casting, molding, and die press forming, etc. One of ordinary skill in the art of mechanical design can appreciate the extent of possible mechanical design tools and applications used in design process 710 without deviating from the scope and spirit of the invention. Design process 710 may also include modules for performing standard circuit design processes such as timing analysis, verification, design rule checking, place and route operations, etc.

Design process 710 employs and incorporates logic and physical design tools such as HDL compilers and simulation model build tools to process design structure 720 together with some or all of the depicted supporting data structures along with any additional mechanical design or data (if applicable), to generate a second design structure 790. Design structure 790 resides on a storage medium or programmable gate array in a data format used for the exchange of data of mechanical devices and structures (e.g., information stored in an IGES, DXF, Parasolid XT, JT, DRG, or any other suitable format for storing or rendering such mechanical design structures). Similar to design structure 720, design structure 790 preferably comprises one or more files, data structures, or other computer-encoded data or instructions that reside on transmission or data storage media and that when processed by an ECAD system generate a logically or otherwise functionally equivalent form of one or more of the embodiments of the invention shown herein. In one embodiment, design structure 790 may comprise a compiled, executable HDL simulation model that functionally simulates the devices shown herein.

Design structure 790 may also employ a data format used for the exchange of layout data of integrated circuits and/or symbolic data format (e.g., information stored in a GDSII (GDS2), GL1, OASIS, map files, or any other suitable format for storing such design data structures). Design structure 790 may comprise information such as, for example, symbolic data, map files, test data files, design content files, manufacturing data, layout parameters, wires, levels of metal, vias, shapes, data for routing through the manufacturing line, and any other data required by a manufacturer or other designer/developer to produce a device or structure as described above and shown herein. Design structure 790 may then proceed to a stage 795 where, for example, design structure 790: proceeds to tape-out, is released to manufacturing, is released to a mask house, is sent to another design house, is sent back to the customer, etc.

As has been described, in one or more embodiments, a processor set has an associated cache memory. A prefetch unit of the processor set generates a prefetch request. The prefetch unit determines whether the prefetch request is likely to miss in the cache memory. The prefetch unit issues the prefetch request based on determining that the prefetch request is likely to miss in the cache memory and otherwise discards the prefetch request. The prefetch request can be a data prefetch request or an instruction prefetch request.

Although embodiments have been described with reference to data prefetching, those skilled in the art will appreciate that the disclosed techniques can similarly be applied to instruction prefetching. Further, although the described embodiments related specifically to a level one (L1) cache memory, those skilled in the art will appreciate that the disclosed techniques can similarly be applied to other levels of cache memory.

While the present invention has been particularly shown as described with reference to one or more preferred embodiments, it will be understood by those skilled in the art that various changes in form and detail may be made therein without departing from the spirit and scope of the invention.

The following definitions are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, system or apparatus that comprises a list of elements is not necessarily limited to only those elements but can include other elements not expressly listed or inherent to such composition, mixture, process, method, article, system or apparatus.

Additionally, the term "exemplary" is used herein to mean "serving as one example, instance or illustration." Any embodiment or design described herein as "exemplary" is not necessarily to be construed as preferred or advantageous over other embodiments or designs. The terms "at least one" and "one or more" shall be understood to include any integer number greater than or equal to one, and the term "plurality" shall be understood to include any integer number greater than or equal to two. The term "coupled" shall include both indirect connection and a direct connection, unless specified otherwise in a particular case. The terms "about," "substantially," "approximately," and variations thereof, are intended to include the degree of error associated with measurement of the particular quantity based upon the equipment available at the time of filing the application. For example, "about" can include a range of ±10% or ±5%, or ±2% of a given value.

The figures described herein and the written description of specific structures and functions are not presented to limit the scope of what Applicants have invented or the scope of the appended claims. Rather, the figures and written description are provided to teach any person skilled in the art to make and use the inventions for which patent protection is sought. Those skilled in the art will appreciate that not all features of a commercial embodiment of the inventions are described or shown for the sake of clarity and understanding. For the sake of brevity, conventional techniques related to making and using aspects of the invention(s) may or may not be described in detail herein, and many conventional implementation details are only mentioned briefly or are omitted entirely. Persons of skill in this art will also appreciate that the development of an actual commercial embodiment incorporating aspects of the present inventions will require numerous implementation-specific decisions to achieve the developer's ultimate goal for the commercial embodiment. Such implementation-specific decisions may include, and likely are not limited to, compliance with system-related, business-related, government-related and other constraints, which may vary by specific implementation, location and from time to time. While a developer's efforts might be complex and time-consuming in an absolute sense, such efforts would be, nevertheless, a routine undertaking for those of skill in this art having benefit of this disclosure. It must be understood that the inventions disclosed and taught herein are susceptible to numerous and various modifications and alternative forms. Lastly, the use of a singular term, such as, but not limited to, "a" is not intended as limiting of the number of items.

What is claimed is:

1. A computer-implemented method of prefetching, the method comprising:

a prefetch unit of a processor core generating a prefetch request, the processor core having an associated cache memory and a processor core;

the prefetch unit determining whether the prefetch request is likely to miss in the cache memory;

a history register tracking hit/miss results of a last N number of prefetch and demand fetch accesses to the cache memory to generate a history pattern recorded in the history register, wherein the history register is an N-bit shift register; and the prefetch unit issuing the prefetch request based on determining that the prefetch request is likely to miss in the cache memory and otherwise discarding the prefetch request, wherein the processor core includes a history-based hit/miss predictor; and the determining includes determining whether the prefetch request is likely to miss in the cache memory based on an entry in the history-based hit/miss predictor, wherein the prefetch request is likely to miss in the cache memory responsive to a counter value of the history-based hit/miss predictor being less than a threshold, the counter value being stored in a predictor entity of the history-based hit/miss predictor and being selected by the history pattern over the last N number of prefetch and demand fetch accesses to the cache memory.

2. The method of claim 1, wherein the prefetch request is a data prefetch request.

3. The method of claim 1, wherein the prefetch request is an instruction prefetch request.

4. The method of claim 1, wherein the cache memory is a level-one cache memory.

5. The method of claim 1, wherein:

the cache memory is a first cache memory;

the processor core is coupled to a second cache memory;

the method further includes:

the prefetch unit determining whether a time slot is available in a request pipeline to the second cache memory; and based on determining a time slot is not available, the processor core pausing demand fetching on the request pipeline to create a time slot for the issuing of the prefetch request.

6. The method of claim 1, wherein generating the prefetch request includes generating the prefetch request based on an instruction address or operand address of a demand request.

7. A processor set, comprising:

a cache memory; and a processor core including a prefetch circuit having a hit/miss predictor, wherein the prefetch circuit is configured to perform operations including:

generating a prefetch request;

determining by reference to the hit/miss predictor whether the prefetch request is likely to miss in the cache memory;

tracking, using a history register, hit/miss results of a last N number of prefetch and demand fetch accesses to the cache memory to generate a history pattern recorded in the history register, wherein the history register is an N-bit shift register; and issuing the prefetch request based on determining that the prefetch request is likely to miss in the cache memory and otherwise discarding the prefetch request, wherein:

the hit/miss predictor is a history-based hit/miss predictor; and the determining includes determining whether the prefetch request is likely to miss in the cache memory based on an entry in the history-based hit/miss predictor, the counter value being stored in a predictor entity of the history-based hit/miss predictor and being selected by the history pattern over the last N number of prefetch and demand fetch accesses to the cache memory.

8. The processor set of claim 7, wherein the prefetch request is a data prefetch request.

9. The processor set of claim 7, wherein the prefetch request is an instruction prefetch request.

10. The processor set of claim 7, wherein the cache memory is a level-one cache memory.

11. The processor set of claim 7, wherein:

the cache memory is a first cache memory;

the processor core is coupled to a second cache memory;

the operations further include:

determining whether a time slot is available in a request pipeline to the second cache memory; and based on determining a time slot is not available, pausing demand fetching on the request pipeline to create a time slot for the issuing of the prefetch request.

12. The processor set of claim 7, wherein generating the prefetch request includes generating the prefetch request based on an instruction address or operand address of a demand request.

13. A data processing system, comprising:

a processor set according to claim 7, wherein the cache memory is a first cache memory; and a second cache memory communicatively coupled to the first cache memory.

14. A design structure tangibly embodied in a non-transitory machine-readable storage device for designing, manufacturing, or testing an integrated circuit, the design structure comprising:

a processor set, including:

a cache memory; and a processor core including a prefetch circuit having a hit/miss predictor, wherein the prefetch circuit is configured to perform operations including:

generating a prefetch request;

determining by reference to the hit/miss predictor whether the prefetch request is likely to miss in the cache memory;

tracking, using a history register, hit/miss results of a last N number of prefetch and demand fetch accesses to the cache memory to generate a history pattern recorded in the history register, wherein the history register is an N-bit shift register; and issuing the prefetch request based on determining that the prefetch request is likely to miss in the cache memory and otherwise discarding the prefetch request, wherein:

the hit/miss predictor is a history-based hit/miss predictor; and the determining includes determining whether the prefetch request is likely to miss in the cache memory based on an entry in the history-based hit/miss predictor, the counter value being stored in a predictor entity of the history-based hit/miss predictor and being selected by the history pattern over the last N number of prefetch and demand fetch accesses to the cache memory.

15. The design structure of claim 14, wherein the cache memory is a level-one cache memory.

16. The design structure of claim 14, wherein:

the cache memory is a first cache memory;

the processor core is coupled to a second cache memory;

the operations further include:

determining whether a time slot is available in a request pipeline to the second cache memory; and based on determining a time slot is not available, pausing demand fetching on the request pipeline to create a time slot for the issuing of the prefetch request.

17. The design structure of claim 14, wherein generating the prefetch request includes generating the prefetch request based on an instruction address or operand address of a demand request.

* * * * *